Oct. 5, 1948.     N. N. SOLOVIOFF ET AL     2,450,491

HELICOPTER

Filed May 3, 1943     6 Sheets-Sheet 1

Oct. 5, 1948.  N. N. SOLOVIOFF ET AL  2,450,491

HELICOPTER

Filed May 3, 1943  6 Sheets-Sheet 2

*Fig. 2.*

INVENTORS
NICHOLAS N. SOLOVIOFF
NELSON G. KLING
BY
Blair, Curtis & Hayward
ATTORNEYS

Patented Oct. 5, 1948

2,450,491

UNITED STATES PATENT OFFICE 2,450,491

HELICOPTER

Nicholas N. Solovioff and Nelson G. Kling, Great Neck, N. Y., assignors to Airex Manufacturing Company, Inc., Long Island City, N. Y., a corporation of New York Application May 3, 1943, Serial No. 485,410

17 Claims. (Cl. 244—17)

This invention relates to helicopters and more particularly to automatic stabilizing apparatus therefor.

One of the many problems which has arisen in helicopter development, and one of the most vexatious, is that of stabilization of the aircraft, particularly while hovering. In order for the helicopter to hover, the axis of its rotor rotation must be vertical, any deviation therefrom causing horizontal travel. Various and unpredictable influences, such as a sudden gust of wind, will react quickly on the rotor, forcing its axis away from the vertical, and thus causing horizontal propulsion in the direction toward which the axis slants. Unless the rotor axis can be quickly returned to the vertical, horizontal travel, pendular swinging, violent dodging, or other undesired movement results, and hovering, or precision maneuvering, is difficult or impossible to attain.

While a multibladed rotor, if properly designed and balanced aerodynamically, is inherently stable and will eventually return to rotation about a vertical axis, the period of return, if sufficiently extended, results in horizontal travel. To shorten this period of return to the vertical, i. e. hovering attitude, it is necessary to expedite the stabilization to counteract or compensate the upsetting influence with sufficient rapidity to prevent horizontal travel. One of the most efficient methods of compensation or stabilization is to vary the angle of incidence or attack of the rotor blades, increasing the angle of the depressed blade or blades, and decreasing that of the elevated, thus increasing the upward lift at the lower side of the rotor while decreasing the lift at the higher side.

Although the advantages of changing the blades' angles of attack has been appreciated, many problems, such as the phase of the change, the manner of accomplishing it, the effects of blade flap, and others, arose, the solutions of which are considerably complicated, and particularly where a plurality of coaxial rotors are used. Still further difficulties arose through what we shall hereinafter term the phenomena of lift lag and torque drag which render stabilization by angle of attack variation complex.

It is accordingly among the objects of our invention to provide automatic stabilizing apparatus for a helicopter by which the above difficulties, in addition to others, are overcome in a thoroughly dependable, efficient and practical manner. Other objects will be in part apparent and in part pointed out hereinafter.

The invention accordingly consists in the features of construction, combinations of elements, and arrangements of parts, as will be exemplified in the structure to be hereinafter described, and the scope of the application of which will be indicated in the following claims.

In the drawing, wherein we have shown one form of our invention.

Similar reference characters refer to similar parts throughout the various views of the drawing.

Figure 1:
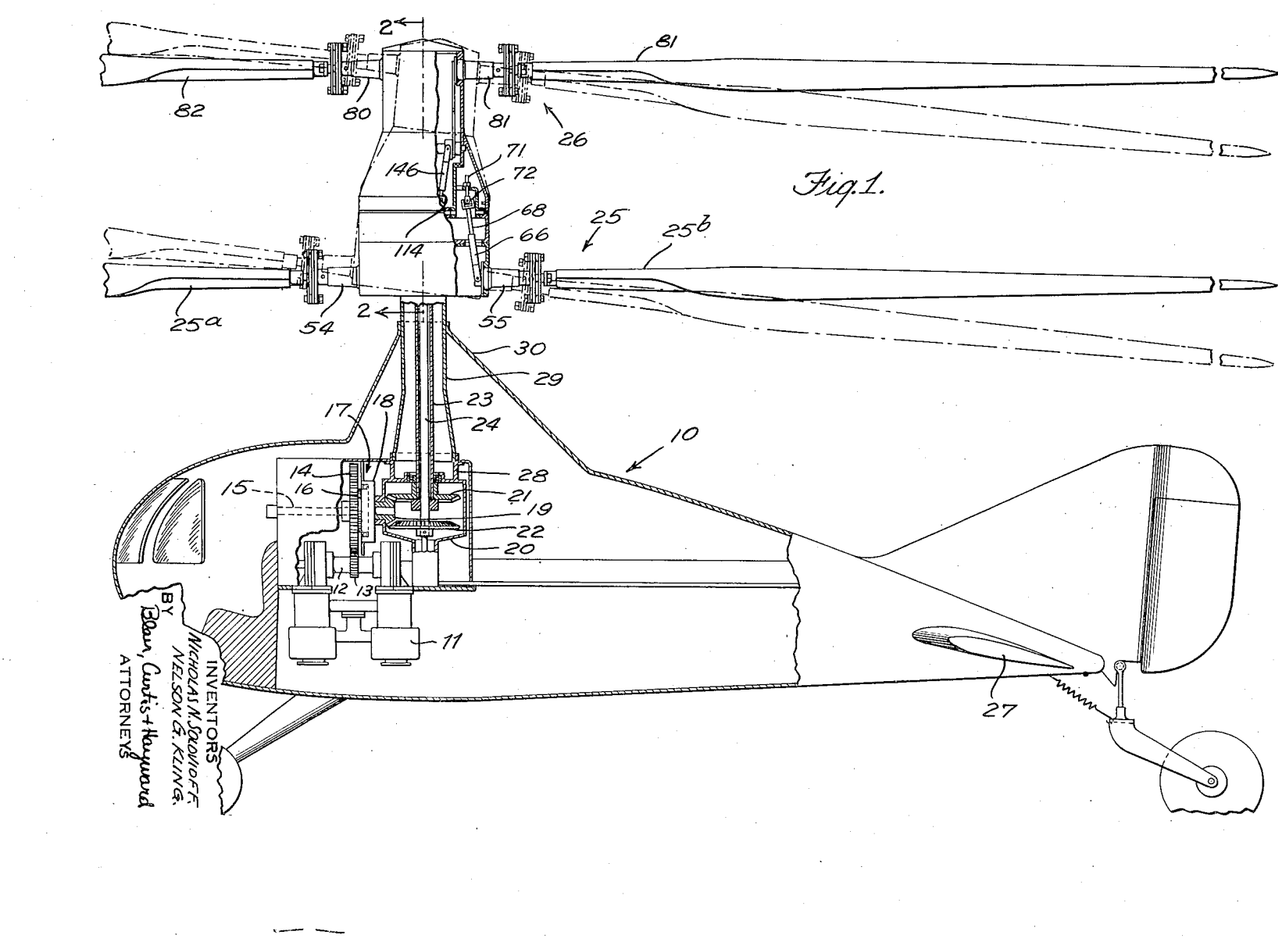
Figure 1 is a fragmentary side elevation of a helicopter showing our stabilizing apparatus, certain portions being broken away and others shown in section.

Referring first to Figure 1, the fuselage of the helicopter is generally indicated at 10, and has housed therein a power plant 11 which, through a shaft 12 and pinion 13, drives a gear 14 mounted on a suitably journaled shaft 15. One element 16 of an overrunning clutch, generally indicated at 17, is fastened to gear 14, while the other element 18 of the clutch has attached thereto a bevel gear 19, the hub of which is rotatably mounted in a housing 20. Bevel gear 19 meshes with an upper bevel 21 and a lower bevel 22 which are respectively attached to a sleeve 23 and a shaft 24 which extends upwardly through the sleeve, the sleeve and shaft being fastened respectively to a lower rotor generally indicated at 25, and an upper rotor generally indicated at 26.

It accordingly follows that the power plant or motor 11, through gears 13 and 14, clutch 17 and bevel 19, drives gears 21 and 22 in opposite directions, accordingly to rotate rotors 25 and 26 oppositely. Through the provision of overrunning clutch 17, the rotors are free to autogyrate in the event of motor failure, thus permitting the helicopter to descend slowly. The helicopter fuselage 10 is also provided with a stabilizer 27 or the like.

Housing 20 includes an upwardly extending annular bracket 28, to which is secured the bottom of a column 29, which may be supported at its upper end by a strut 30 or the like, carried by fuselage 10.

Figure 3:
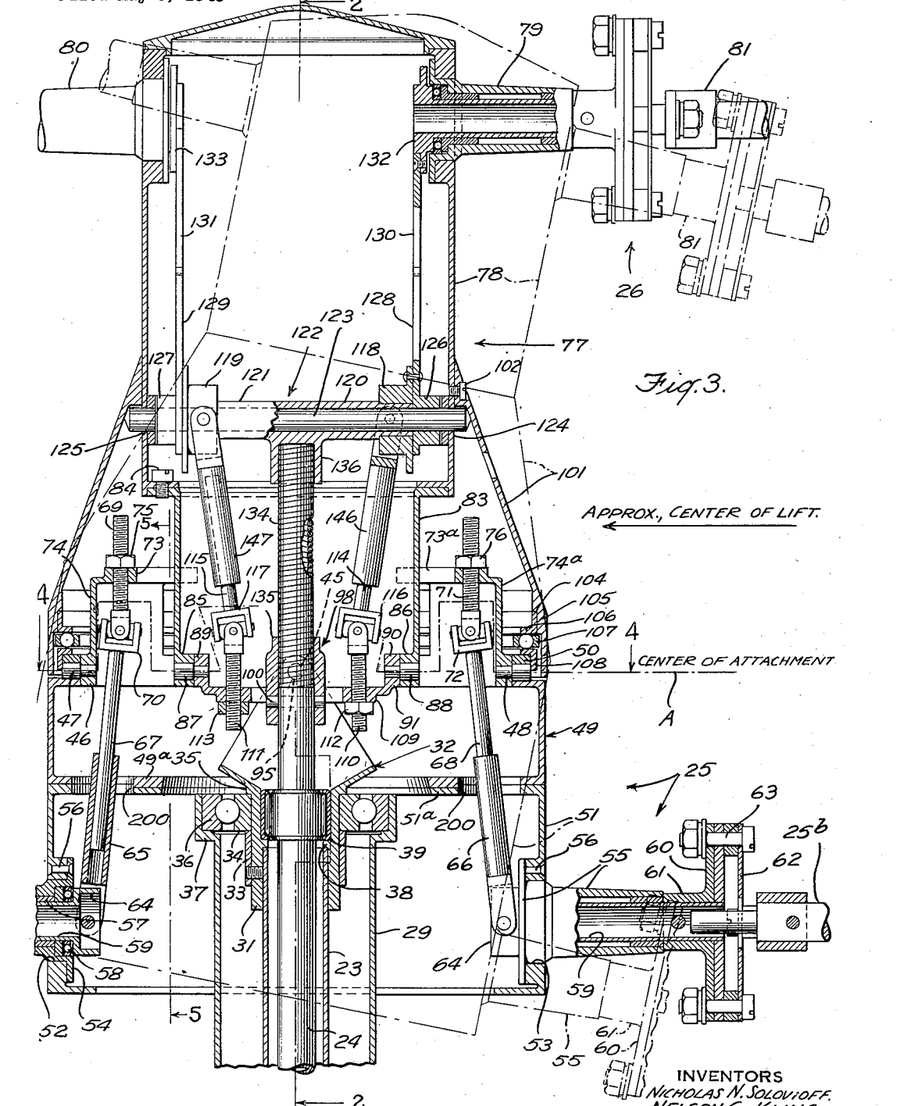
Figure 3 is an enlarged section taken along the line 3—3 of Figure 2.

As shown in Figure 3, sleeve 23 and shaft 24 extend upwardly through column 29, and the sleeve is attached to the hub 31 of a yoke generally indicated at 32. A collar 33 is also attached to hub 31, and, together with a shoulder 35 formed on yoke 32, grips the inner race of an antifriction bearing 36, the outer race of which is supported by a shoulder 37 formed at the top of column 29. Hub 31 of the yoke is hollow and is provided with a seating ring or shoulder 38 against which the upper end of sleeve 23 bears, and on which is supported the shell of a roller bearing 39, in which the upper end of shaft 24 is journaled. Thus the upper ends of sleeve 23 and shaft 24 are free to rotate in opposite directions and relative to the top of column 29 which, through bearings 36 and 39 hold the sleeve in coaxial relationship against lateral displacement relative to the column.

Figure 4:
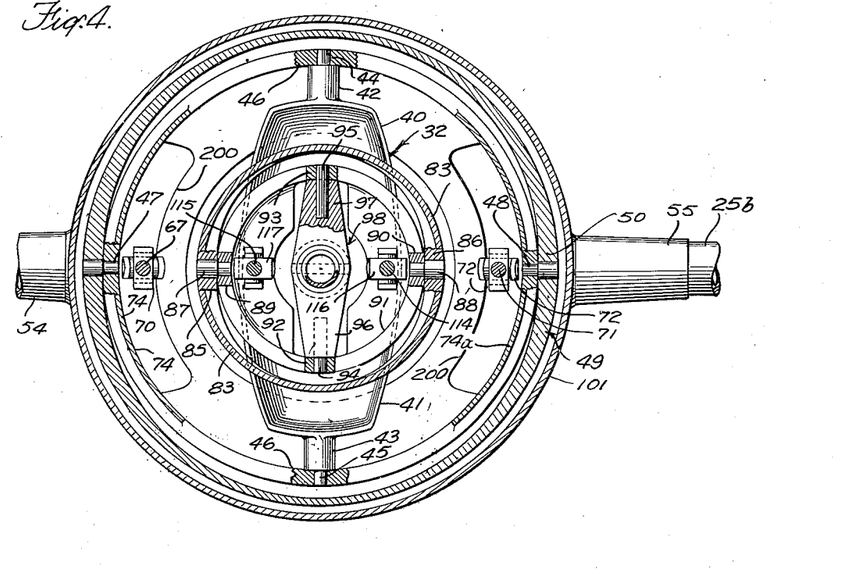
Figure 4 is a horizontal section taken along the line 4—4 of Figure 3.
Figure 5:
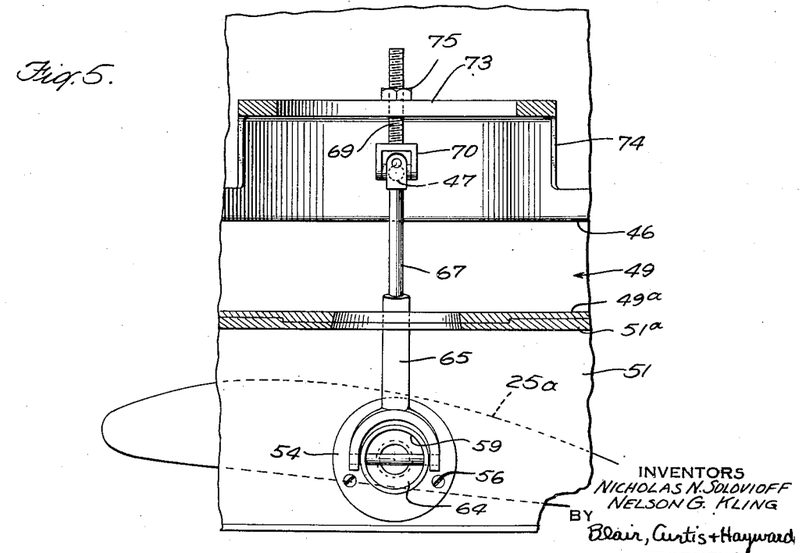
Figure 5 is a vertical section taken along the line 5—5 of Figure 3.

As pointed out above, sleeve 23 rotates the lower rotor 25, while shaft 24 rotates the upper rotor 26, and accordingly the lower rotor system will be described first. Thus, as is more clearly shown in Figure 2, yoke 32 includes diverging arms 40 and 41, the upper ends of which respectively have coaxial bosses 42 and 43 formed integrally thereon. Secured in these bosses are gimbal pins 44 and 45, respectively, which extend outwardly of the bosses and are freely rotatably received in a gimbal ring 46. Thus, as shown in Figure 4, gimbal ring 46 is rockable about the common axis of pins 44 and 45, and constitutes one gimbal for the lower rotor assembly, as will appear hereinafter.

Displaced 90° from the axis of gimbal pins 44 and 45 is the common axis of a second pair of gimbal pins 47 and 48, which rotatably extend into gimbal ring 46 through suitable holes formed therein, the outer ends of these pins being enlarged and fastened in a bell-like housing 49 (Figure 3) which has an upwardly extending flange 50 in which gimbal pins 47 and 48 are mounted. Housing 49 has suitably fastened thereto a downwardly extending collar 51 which, with the housing, constitutes the hub of lower rotor 25 and accordingly carries and drives the two blades 25a and 25b (Figure 1) which comprise the lower rotor. Housing 49 and collar 51 respectively have a bottom 49a and top 51a which are open at the center, and which are so formed as to provide a slot 200 (Figure 4) for a purpose described hereinafter. It may accordingly be seen that the lower rotor 25 is universally supported by yoke 32 by means of the gimbal rings and pins heretofore described, the lower rotor thus being displaceable from a position normal to the axis of sleeve 23, for a purpose to be described hereinafter.

Collar 51 (Figure 3) is provided with two openings 52 and 53, displaced 180° and adapted to receive respectively rotor blade housings 54 and 55, these housings being secured to collar 51 in any suitable manner, as by screws or rivets 56. Within each housing is an inner bushing 57 and an anti-friction bearing 58 which journal a sleeve 59, to the outer end of which is fastened a flange 60 having a hub 61. The extremity of the hub is reduced to the inner diameter of housing 55, and accordingly forms, in effect, another bushing to facilitate the rotation of sleeve 59 and hold it against excessive play within the housing.

Rotor blade 25b is suitably secured to a resilient disc 62 which is, in turn, fastened to flange 60 as by bolts 63, and this disc permits a certain amount of universal movement of blade 25b thus permitting the blade to flap within desired limits.

Sleeves 59 have enlarged annular inner ends 64 to which are respectively pivotally attached the bifurcated lower ends of tubes 65 and 66, which extend upwardly through slots 200, and which telescopically receive shafts 67 and 68, respectively. The upper end of shaft 67 is connected to the lower end of a threaded stud 69 by a universal joint 70, while the upper end of shaft 68 is fastened to the lower end of a threaded stud 71 by a universal joint 72. The upper end of stud 69 is threaded through a horizontal flange 73 formed on the top of an arcuate wall 74 which is integral with and extends upwardly from gimbal ring 46. Threaded stud 71 also extends through a flange 73a similar to flange 73 and formed on the top of an arcuate wall 74a extending upwardly from the opposite side of gimbal ring 46. The studs 69 and 71 are adjustable axially with respect to flanges 73 and 73a and are held in adjusted position by lock nuts 75 and 76 threaded on the upper ends of the studs against the top of the ring. It will be noted that the intersection of the axes of universal joints 70 and 72 lies above a horizontal plane passing through the common axis of these gimbal pins 47, 48 and 44, 45. This relative spacing is variable in accordance with the setting of the threaded studs 69 and 71, and controls the amount of variation of the angle of incidence or attack of the blades of lower rotor 25 when this rotor is displaced from its attitude normal to its drive shaft 23 about the common axis of gimbal pins 47 and 48, as will be more fully described hereinbelow. If the intersections of the axes of universal joints 70 and 72 were coincident with the common axis of gimbal pins 47 and 48, the angle of attack of the rotor blades could not be varied. Thus it will appear that when housing 49 and collar 51, and accordingly lower rotor 25 are displaced by some influence, such as, for example, a gust of wind, about the common axis of gimbal pins 47 and 48, one rotor blade sleeve 59, and accordingly its blade 25b, for example, is rotated slightly by the action of the linkage comprising tube 66, shaft 68, universal joint 72, and stud 71, thus changing the angle of attack of the blade. In similar manner, the angle of attack of blade 25a is varied through the action of the linkage comprising tube 65, shaft 67, universal 70 and stud 69, this variation in the angle, however, being in the opposite direction to the variation in the angle of blade 25b.

If, however, the disturbing influence is such as to rock or displace lower rotor 25 about the axis of gimbal pins 44 and 45 (Figures 3 and 4) there is no variation imparted to the angles of attack of the lower rotor blades in their positions shown, as the above-described linkages are ineffective to change these angles due to their 90° displacement from the common axis of gimbal pins 44 and 45.

The upper rotor 26 is secured to and driven by a bell-shaped housing, generally indicated at 77, which, as will be described, is attached to and driven by shaft 24 and accordingly rotates the upper rotor oppositely to lower rotor 25. Thus bell 77 includes an upper housing 78 on opposite sides of which are attached casings 79 and 80, which are generally similar to casings 54 and 55, and which pivotally support the upper rotor blades 81 and 82, respectively, (Figure 1) in substantially the same manner in which the lower rotor blades are supported by their casings 54 and 55.

To the lower end of housing 78 (Figure 3) is fastened an annular skirt 83, as by suitable screws 84, the bottom of this skirt being provided with oppositely disposed bosses 85 and 86 in which are respectively attached gimbal pins 87 and 88. The inner ends of these gimbal pins are reduced and are pivotally carried, respectively, by bosses 89 and 90 formed integrally with a gimbal ring 91 (see also Figure 4). Gimbal ring 91 includes oppositely disposed integral bosses 92 and 93 which pivotally receive, respectively, the outer ends of a pair of gimbal pins 94 and 95, the inner ends of which are respectively fastened in the ends 96 and 97 of an arm generally indicated at 98. This arm, as viewed in Figure 2, includes a downwardly extending hub 99 within which the upper end of shaft 24 is secured, as by a pin 100.

Figure 2:
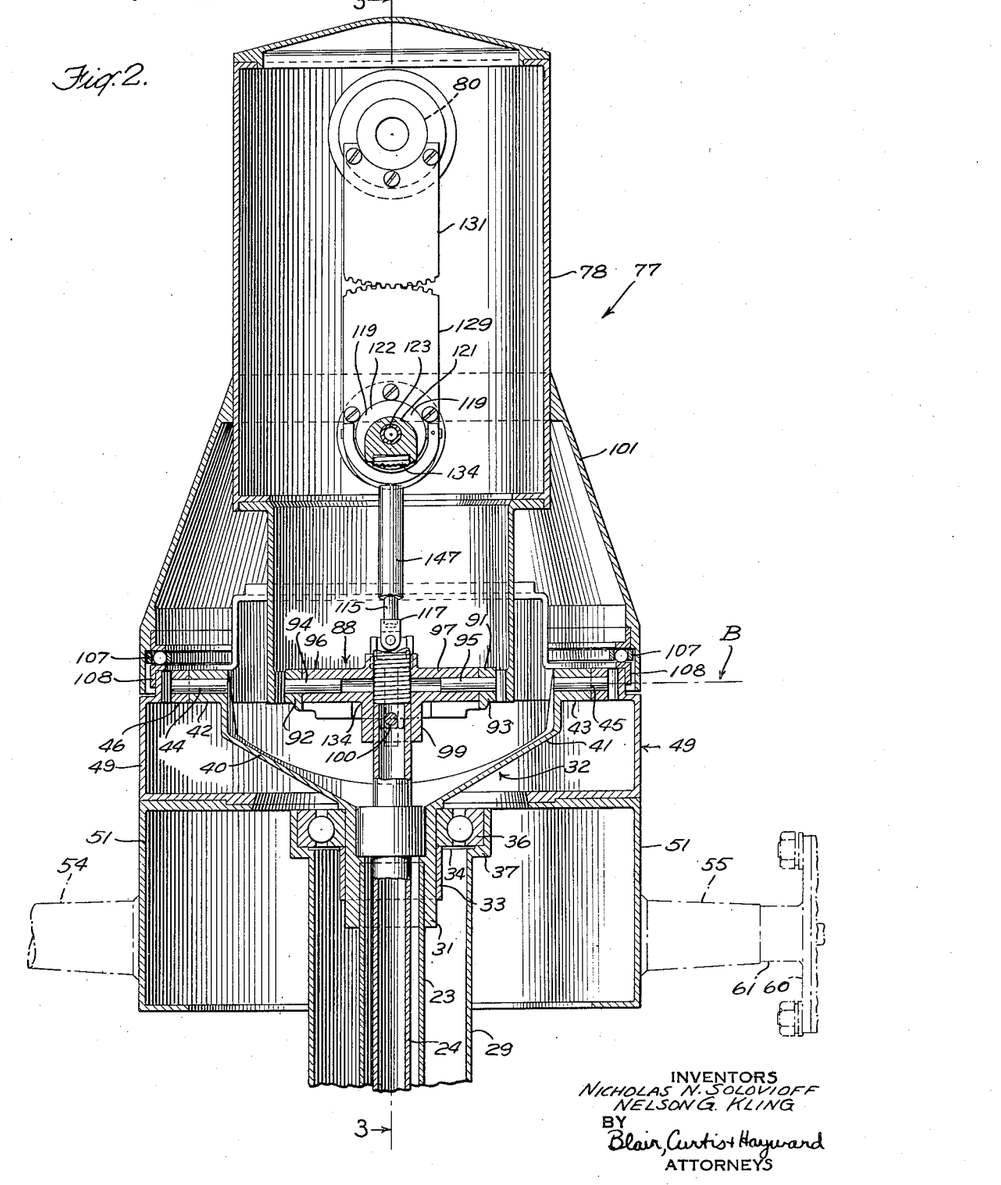
Figure 2 is an enlarged section taken along the line 2—2 of Figure 1.

From the above, and from a consideration of Figures 2, 3 and 4, it may be seen that gimbal pins 47, 48, 87 and 88 have a common axis which we have indicated by the letter A in Figure 3, while gimbal pins 45, 46, 94 and 95 have a common axis indicated at B (Figure 2). It will also be noted that these axes A and B lie in the same plane, and accordingly enable universal movement of the upper and lower rotors about these two axes. Furthermore, these axes A and B may be referred to as the center of attachment of the entire rotor assembly to the driving sleeve 23 and the driving shaft 24, and this center of attachment lies below the center of lift (which is approximately midway between the upper and lower rotors).

It may also be seen that upon rotation of drive shaft 24, arm 98 is rotated, thus driving gimbal ring 91, which in turn drives skirt 83 and accordingly bell 77 and upper rotor 26.

The upper bell housing 77 and lower housing 49, while having a common axis, rotate in opposite directions, as noted above, and accordingly it is necessary to make provision for this relative rotation. To this end a frusto-conical shell 101 (Figure 3) is fastened at its upper end, as by screws 102, to housing 78, the lower end of the shell being provided with a shoulder 104 against which is seated a ring 105. Ring 105 is L-shaped in cross section, and accordingly includes an inwardly directed annular flange 106, which forms the upper race for a large ball bearing 107. The lower race for bearing 107 is provided by the inwardly directed flange of a ring 108 which is fastened to the upper part of housing 49. Thus bearing 107 provides for substantially frictionless relative movement between the upper and lower rotor assemblies. Furthermore, shell 101 effectively bridges the gap between the upper and lower housings, and provides a protective cover for the mechanisms contained therebetween.

Gimbal ring 91 (Figure 3) includes a preferably integral annular neck 109 through opposite sides of which are adjustably threaded studs 110 and 111 which may be held in adjusted position respectively by lock nuts 112 and 113. These two studs are connected respectively to shafts 114 and 115 by universal joints 116 and 117, the shafts in turn being respectively telescopically related to tubes 146 and 147. The upper ends of these tubes are bifurcated and are pivotally secured respectively to hubs 118 and 119 which are rotatably mounted on the opposite ends 120 and 121 of a bracket generally indicated at 122. A shaft 123 extends through this bracket and has its opposite ends mounted respectively in holes 124 and 125 formed on opposite sides of the lower portion of housing 78.

Secured to the opposite ends of shaft 123 are hubs 126 and 127 which are formed respectively on the lower end of gear sectors 128 and 129, which sectors are in turn respectively secured to flanges on hubs 118 and 119 (see also Figure 2). These gear sectors 128 and 129 (Figure 3) mesh respectively with upper gear sectors 130 and 131, the upper ends of which are fastened to sleeves 132 and 133, respectively, connected to upper rotor blades 81 and 82.

It will now appear that stud 110, universal 116, shaft 114, tube 146, hub 118 and gear sectors 128 and 130 comprise a linkage which rocks blade 81 to vary its angle of attack when the rotor assemblies are displaced about the axis A. Similarly the angle of attack of blade 82 is varied upon displacement or rocking of the rotor assembly about axis A by the other linkage, comprising stud 111, universal 117, shaft 115, tube 147, hub 119 and gear sectors 129 and 131. Furthermore, as in the case of the lower rotors, the angle of attack of the upper rotor blades can only be varied when the intersection of the axes of universal joints 116 and 117 is above the center of attachment, i. e. axis A, and hence the limit of the variation of the angle of attack of the upper blades may be varied as desired through the adjustment afforded by threaded studs 110 and 111.

In order to prevent the rotor assemblies from tilting over when idle, we interpose a stiff coiled spring 134 between arm 98 and bracket 122, the opposite ends of the spring being conveniently disposed within a cup-like boss 135 extending upwardly from arm 98 and a similar boss 136 extending downwardly from bracket 122.

Figure 7:
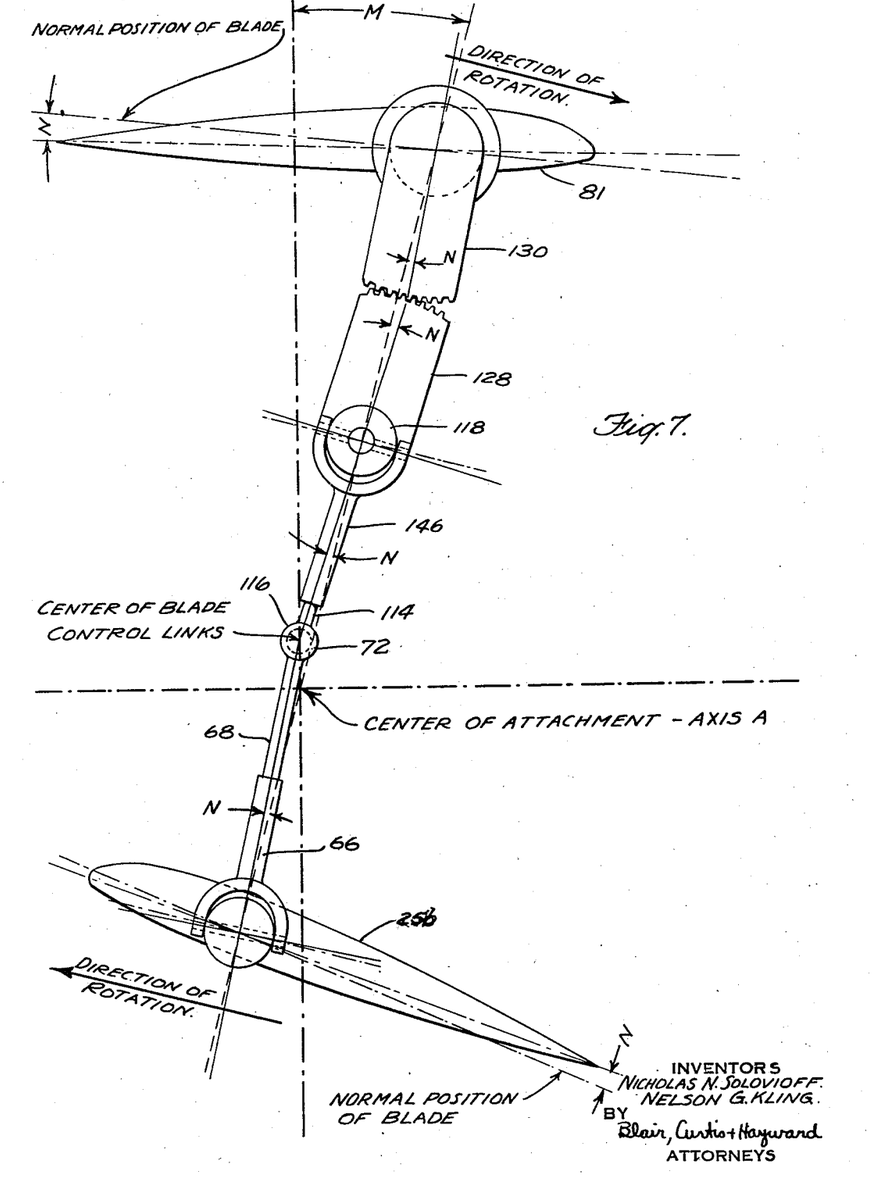

The variation of the angles of attack is illustrated in Figure 7, wherein lower and upper blades 25b and 81, together with their associated control links are schematically shown. Thus with the blades rotating in opposite directions, as indicated by the arrows, and with their axis of rotation displaced from the vertical, the lower blade 25b is rocked counterclockwise by an amount N from its normal position or angle of attack, the upper blade similarly rocked by a similar amount. Thus it will follow that the variation in the angle of attack is a function of the displacement or the variation of the rotor's axis of rotation from the normal with respect to the center of attachment of the rotors.

Figure 6:
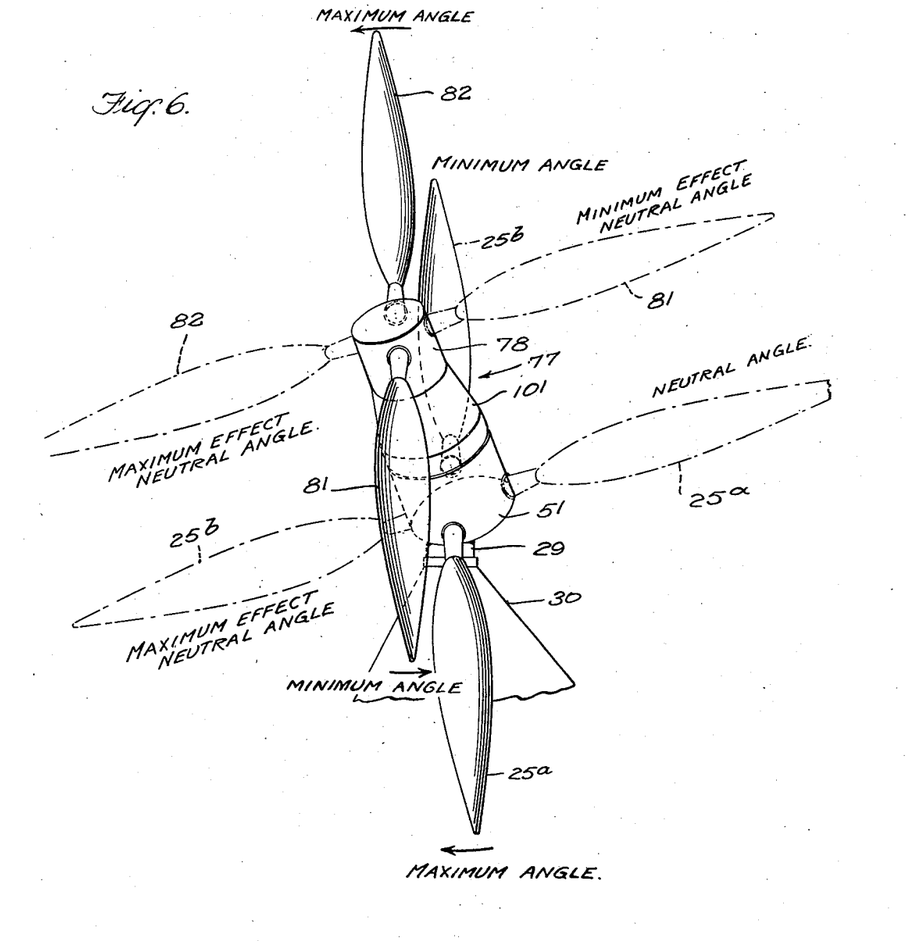
Figure 6 is a reduced schematic perspective view showing the rotors tilted; and, Figure 7 is an enlarged schematic view illustrating the variation in angle of attack of the rotor blades.

In operation, i. e. when the helicopter is hovering, if some disturbing influence, such as a gust of wind occurs, the rotor assembly may be forced from its normally vertical axis of operation as shown in Figure 1, thus forcing the rotor assembly downwardly and toward the left into the position shown in Figure 6. The rotors are illustrated at the instant when the upper directly overlies the lower when in line with the fuselage and also when extending directly abeam thereof. Thus when so tilted and aligned with the fuselage, all blades are at their normal angles of attack as the rotor assembly displacement is about axis B (Figure 2) which has no effect on the linkage that controls the blade angles. However, as the two rotors rotate from this position, the control linkages become increasingly effective, thus increasing the angles of attack of those blades which are advancing from the higher side of the rotors to the lower, and decreasing the angles of attack of those blades which are leaving the low side and approaching the high. As the gimbal axes are displaced 90°, the maximum and minimum angles of attack are imparted to the blades when the rotor assembly is displaced about the axis A (Figure 3), i. e. when the rotors again overlie one another but are dead abeam of the fuselage. Thus the maximum and minimum variations occur at 90° from the starting point at which the angles were normal or neutral. In other words, the angle of each blade may be considered neutral at 0°, maximum at 90°, neutral at 180° and minimum at 270° as the blade rotates from the high side of the rotor, through the low side and back to the high.

More specifically, and with reference to Figure 6, the angle of attack of blade 25a is normal when the blade is in its dotted line position. This is also true of blades 25b, 81 and 82. As blade 25a rotates clockwise from this dotted line or 0° position 90° to its full line position, its control linkage gradually rocks the blade in the manner described to its maximum angle of attack. For various reasons, however, although this blade is at its maximum angle of attack at 90° its lifting effect is not at a maximum until the blade reaches its 180° position, i. e. the dotted line position of blade 25b.

Also, blade 82 of the upper rotor which is rotating oppositely, illustratively counterclockwise, is rocked to its maximum angle of attack in the manner described when in its solid line position, although its maximum effect or reaction is not attained until it has rotated 180°, i. e. until it is in the dotted line position shown. Thus it will appear that in the case of each of the blades there is provided what we term the angle of advance, i. e. the angle defined by the position of maximum angle of attack and the position of maximum effect as the blade rotates from the high to the low side of the tilted rotor.

We have illustratively shown this angle of advance to be 90°, but the angle may be varied as desired by varying the position of the blade control linkages relative to the gimbal axes. Thus the linkages for the lower blades may extend through slots 200 (Figure 4) in accordance with the angle of advance desired, suitable holes being provided in flanges 73 and 73a (Figure 3) for the reception of studs 69 and 71, respectively. Hence the entire assembly of lower rotor 25 may be adjusted angularly relative to axis A by disconnecting studs 69 and 71 from flanges 73 and 73a and collar 51 from housing 49, then rotating the collar together with the attached blades the desired amount and reattaching the several parts.

The upper rotor assembly is, of course, adjusted by a similar amount, this adjustment being possible through the provision of suitably spaced holes in neck 109 and also by reason of the adjustable connection between housing 78 and skirt 83. Thus studs 110 and 111 may be withdrawn from neck 109 and screw 84 removed from the housing and skirt, whereupon the entire upper rotor assembly may be revolved angularly to the desired amount of angle of advance and held therein by the reattachment of the several parts. Of course, the angle of advance of one rotor may, under certain circumstances, and if desired, be set at a value greater or less than the angle of advance of the other rotor by means of the adjustments described.

As noted above, there are several reasons for the lag in reaction between change of angle of attack and change of effect thereof. One of these reasons seems to arise from an inherent aerodynamic principle in rotating wing aircraft, namely that the lift resulting from increasing the angle of attack is not a sudden effect, but is a cumulative one, the increments of increase of lift value lagging behind the increments of increase in angle of attack value. Thus, by advancing the position of change of angle of attack relative to the position of change of effect, we can attain maximum lift at the desired position, namely the dotted line positions of blades 25b and 82 (Figure 6) when the rotors are tilted as indicated. It should be noted in this connection that the retreating blades 25b and 81 (solid line positions) are at minimum angle of attack and hence exert minimum effect when in the dotted line positions 81 and 25a where minimum lift is desired. Thus there is maximum lift on the low side of each rotor and minimum on the high side, producing a moment which greatly shortens the period of return of the rotors to a position of rotation about a vertical axis.

Another of these reasons appears to arise from what we term torque drag. Thus, referring to Figure 6, as blades 25a and 81 rotate oppositely from the 3 o'clock position, wherein their angles of attack are normal to the 6 o'clock and 12 o'clock positions, respectively, wherein their angles of attack are maximum, there is a torque reaction which is directly opposed to the path of movement of each of these blades, the resultant of this reaction being opposed to the direction of inclination of the rotor assembly and accordingly tending to restore the assembly to vertical. However, because of factors of inertia of the assembly and wind resistance on the blades, and because of an oppositely directed torque reaction (but of lesser value) caused by the other two blades (the retreating blades), there is a lag in the restoring movement; the maximum net effect of the torque reaction accordingly occurring when the advancing blades 25a and 81 are in the 9 o'clock position at the lower sides of the rotors.

It will accordingly appear that through the automatic control of the rocking movement of the rotor blades, the angle of attack thereof is varied in such a manner that the period of return of the rotors to the desired or normal planes of rotation is so materially shortened as to greatly increase the stability of the rotors.

We have accordingly provided automatic stabilizing apparatus for a helicopter which attains the several objects set forth hereinabove in a thoroughly practical and efficient manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

We claim:

1. In rotor construction for a helicopter, in combination, a support, rotatable driving means carried by said support, a gimbal ring pivotally secured to said driving means, a housing pivotally secured to said ring, the pivotal axes of said housing and said ring being at right angles, a rotor blade rockably mounted on said housing, and a control mechanism connected to said gimbal ring and to said rotor blade for rocking said blade when said housing pivots about its axis.

2. In rotor construction for a helicopter, in combination, a support, rotatable driving means carried by said support, a gimbal ring pivotally secured to said driving means, a housing pivotally secured to said ring, the pivotal axes of said housing and said ring being at right angles, a rotor blade rockably mounted on said housing, a control mechanism connected to said gimbal ring and to said rotor blade for rocking said blade when said housing pivots about its axis, said control mechanism including an element adjustably secured to the gimbal ring, a telescopic element secured to the blade, and a universal joint for connecting said elements.

3. In rotor construction for a helicopter, in combination, a support, rotatable driving means carried by said support, a gimbal ring pivotally secured to said driving means, a housing pivotally secured to said ring, the pivotal axes of said housing and said ring being at right angles, a rotor blade rockably mounted on said housing, a control mechanism connected to said gimbal ring and to said rotor blade for rocking said blade when said housing pivots about its axis, said control mechanism including an element adjustably secured to the gimbal ring, a telescopic element secured to the blade, and a universal joint for connecting said elements, the intersection of the axes of said universal joint being spaced from the pivotal axis of said housing.

4. In rotor construction for a helicopter, in combination, a support, rotatable driving means carried by said support, a gimbal ring pivotally secured to said driving means, a housing pivotally secured to said ring, the pivotal axes of said housing and said ring being at right angles, a rotor blade rockably mounted on said housing, a control mechanism connected to said gimbal ring and to said rotor blade for rocking said blade when said housing pivots about its axis, and means for selectively attaching said control member to said gimbal ring in any one of a plurality of positions thereby to vary at will the angle between the position of maximum rocking movement of the blade and the position of maximum effect thereof in the plane of the rotation of the blade.

5. In helicopter construction, in combination, a rotatable support, a rotor blade carrying member, means universally connecting said member to said support, a rotor blade, means mounting said blade on said member for feathering and free flapping movement relative thereto, and control means connected to a portion of said universally connecting means and to said blade for feathering said blade when there is a displacement between the axis of rotation of said support and that of said member about one axis of said universally connecting means.

6. In helicopter construction, in combination, a drive shaft, a rotor blade supporting member, means connecting said member to said shaft for universal movement relative thereto, a rotor blade, means mounting said blade on said supporting member for feathering and free flapping movement relative thereto, control mechanism for feathering said blade when said member moves relative to said shaft, and means for attaching said control mechanism to said connecting means at a point angularly displaced from the position of maximum effect of said blade in the plane of its rotation.

7. In helicopter construction, in combination, a drive shaft, a pair of relatively rotatable rotor blade supporting members, means connecting said members to said shaft for universal rocking movement relative thereto, said means forming a driving connection between said drive shaft and one of said members, a second drive shaft connected to the other of said members for rotating said last-mentioned member in a direction opposite to the direction of rotation of said first-mentioned member, rotor blades mounted on each of said members for feathering and free flapping movement relative thereto, and control mechanism connected to said connecting means and to said blades for feathering said blades when said members move about the axes of said connecting means relative to said first drive shaft.

8. Apparatus according to claim 7 wherein the connecting means comprises a pair of gimbals one of which is pivotally connected to said first drive shaft and the other of which is pivotally connected to the second drive shaft.

9. Apparatus according to claim 7 wherein the connecting means comprises a pair of gimbals one of which is pivotally connected to said first drive shaft and the other of which is pivotally connected to the second drive shaft, and said control mechanism comprises first linkage means extending between said first gimbal and one of said members and second linkage means extending between said second gimbal and the other of said members.

10. Apparatus according to claim 7 wherein the point at which said members are connected to said first drive shaft is positioned substantially below the center of lift of the two rotors.

11. In helicopter construction, in combination, a drive shaft, a rotor blade supporting member, means connecting said member to said shaft for universal movement relative thereto, a rotor blade, means mounting said blade on said support for feathering and flapping movement relative thereto, control mechanism connected to said connecting means and to said blade for feathering said blade when said member moves relative to said shaft, and means for selectively attaching said control mechanism to said connecting means in any one of a plurality of positions thereby to vary at will the angle between the position of maximum feathering of said blade and the position of maximum effect thereof in the plane of rotation of said blade.

12. In helicopter construction, in combination, a rotatable support, a rotor blade carrying member, means universally connecting said member to said support, a rotor blade, means mounting said blade on said member for feathering movement relative thereto, and control means connected to said support and to said blade for feathering said blade when there is a displacement between the axis of rotation of said support and that of said member, said control means comprising a linkage including a universal joint, the center of which is displaced from the center of the universal connection between the rotor blade carrying member and the rotatable support.

13. In helicopter construction, in combination, a rotatable support, a rotor blade carrying member, means universally connecting said member to said support, a rotor blade, means mounting said blade on said member for feathering movement relative thereto, and control means connected to said support and to said blade for feathering said blade when there is a displacement between the axis of rotation of said support and that of said member, said control means comprising a linkage including a universal joint and telescopic connecting means, the center of said universal joint being displaced from the center of the universal connection between the rotor blade carrying member and the rotatable support.

14. In helicopter construction, in combination, a rotatable support, a rotor blade carrying member, means universally connecting said member to said support, a rotor blade, means mounting said blade on said member for feathering movement relative thereto, control means connected to said support and to said blade for feathering said blade when there is a displacement between the axis of rotation of said support and that of said member, said control means comprising a linkage including a universal joint and telescopic connecting means, the center of said universal joint being displaced from the center of the universal connection between the rotor blade carrying member and the rotatable support, and means for varying at will the position of said universal joint to increase or decrease the displacement thereof relative to the center of the universal connection between said member and said support.

15. In helicopter construction, in combination, a drive shaft, a pair of relatively rotatable rotor blade supporting members, means connecting said members to said shaft for universal rocking movement relative thereto, said members including bell-like housings in coaxial alignment, anti-friction members between said housings for rotatably supporting one of them relative to the other, means connecting said supporting members to said shaft for universal rocking movement relative thereto, said means forming a driving connection between said drive shaft and one of said members, a second drive shaft connected to the other of said members for rotating said last-mentioned member in a direction opposite to the direction of rotation of said first-mentioned member, and rotor blades mounted on each of said housings for feathering movement relative thereto.

16. Apparatus according to claim 7 wherein the control mechanism includes a linkage system for each rotor blade, each linkage system including a universal joint which is displaced from the center of the universal connection between the rotor blade supporting members and said drive shaft.

17. Apparatus according to claim 7 wherein the control mechanism includes a linkage system for each rotor blade, each linkage system including a universal joint which is displaced from the center of the universal connection between the rotor blade supporting members and said drive shaft, and means associated with each of said linkage systems for varying the position of its universal joint relative to said center of connection.

NICHOLAS N. SOLOVIOFF.
NELSON G. KLING.

REFERENCES CITED

The following references are of record in the file of this patent:

UNITED STATES PATENTS

| Number | Name | Date |
|---|---|---|
| 1,701,762 | Pitcairn | Feb. 12, 1929 |
| 1,800,470 | Oehmichen | Apr. 14, 1931 |
| 2,037,745 | Vaughn | Apr. 21, 1936 |
| 2,156,334 | Bothezat | May 2, 1939 |
| 2,256,635 | Young | Sept. 23, 1941 |
| 2,256,918 | Young | Sept. 23, 1941 |
| 2,368,698 | Young | Feb. 6, 1945 |
| 2,384,516 | Young | Sept. 11, 1945 |